(12) United States Patent
Sawayanagi et al.

(10) Patent No.: US 6,319,045 B1
(45) Date of Patent: Nov. 20, 2001

(54) CONNECTING STRUCTURE FOR CONNECTORS IN COUPLES

(75) Inventors: Masahiro Sawayanagi; Toru Ikeda; Chieko Torii, all of Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/598,383

(22) Filed: Jun. 21, 2000

(30) Foreign Application Priority Data

Jun. 25, 1999 (JP) .................................................. 11-180443

(51) Int. Cl.[7] .................................................. H01R 13/64
(52) U.S. Cl. ............................ 439/374; 439/34; 439/76.1
(58) Field of Search ............................ 439/374, 34, 76.1, 439/76.2, 78, 83, 926

(56) References Cited

U.S. PATENT DOCUMENTS 5,353,190 * 10/1994 Nakayama et al. ..................... 439/34
5,709,358 * 1/1998 Kubota .................................. 439/34
5,823,815 * 10/1998 Takata .................................. 439/374

* cited by examiner

Primary Examiner—Renee Luebke
Assistant Examiner—Felix O. Figueroa
(74) Attorney, Agent, or Firm—Finnegan, Henderson, Farabow, Garrett & Dunner, L.L.P.

(57) ABSTRACT

A connecting structure is provided for miniaturizing a substrate connector. The substrate connector 37 is fitted to a wiring substrate 17 accommodated in a meter casing 15. The meter casing 15 is provided with a guide part 15b which operates as a guide for a mating connector 41 when it is engaged with the substrate connector 37. Owing to the provision of the guide part 15b, it is possible to prevent the mating connector 41 from being engaged with the substrate connector 37 while the connector 41 is inclined to the connector 37.

10 Claims, 6 Drawing Sheets

CONNECTING STRUCTURE FOR CONNECTORS IN COUPLES

BACKGROUND OF THE INVENTION

1. Field of the Invention

The present invention relates to a connecting structure for connectors in couples. Particularly, the present invention relates to a connecting structure for a connector for a substrate and another connector to be mated with the connector, the former connector being fitted on one surface of the wiring substrate and the latter connector being engaged with the former connector via a through-hole formed in the wiring substrate. Note, the former connector (i.e. connector for wiring substrate) will be referred as "substrate connector", while the latter connector (i.e. connector to be mated with the substrate connector) will be referred as "mating connector".

2. Description of the Related Art

As one example of the prior art, FIG. 1 is a perspective view of a conventional substrate connector 1 and FIG. 2 is a cross sectional view showing the substrate connector 1 fitted on a wiring substrate 3. In the substrate connector 1, a housing 5 is provided with a fit hole 5a for engagement with the mating connector 7. A plurality of male terminals 9 are accommodated in the fit hole 5a. Being embedded in a hood part 5c of the housing 5, each male terminal 9 extends from a bottom 5b of the housing 5 to the open side of the fit hole 5a. That is, each male terminal 9 has one end projecting into the fit hole 5a and the other end as a leader end 9a which projects from the substrate 3 and which is fixed to a conductor on the substrate 3 through a solder 11.

In connecting the mating connector 7 with the substrate connector 1, the mating connector 7 is fitted from the opposite side of the substrate connector 1 into the fit hole 5a through a through-hole 3a formed in the wiring substrate 3, as shown in FIG. 2.

In the above-mentioned connecting structure of the prior art substrate connector 1, however, there is a possibility that the mating connector 7 is forcibly engaged with the substrate connector 1 despite the mating connector's inclination to the substrate connector 1, namely, an occurrence of "improper mating". In order to avoid the occurrence of improper mating, the substrate connector 1 has the hood part 5c formed to have a relatively long height H and correspondingly, the male terminals 9 are long in full lengths.

For the above reasons, since the substrate connector 1 is large-sized as a whole, there may be caused an impossibility to establish the substrate connector 1 in an appropriate position because of various restrictions while causing the rising of manufacturing cost.

SUMMARY OF THE INVENTION

Under the circumstances, it is therefore an object of the present invention to provide a small-sized substrate connector.

The object of the present invention described above can be accomplished by a connecting structure for a substrate connector and a mating connector to be mated with the substrate connector, the substrate connector having at least one terminal and a terminal retainer for carrying the terminal. The connecting structure comprises an instrument casing and a wiring substrate fitted to the instrument casing, the wiring substrate having one surface opposing the instrument casing and the other surface having the substrate connector fitted thereon. The connecting structure characterized in that the instrument casing and the wiring substrate are together provided with respective insertion parts which allow the mating connector to be inserted thereinto when the mating connector is engaged with the substrate connector and that the insertion part of the instrument casing has a guide part formed to extend toward the wiring substrate, for guiding the insertion of the mating connector being engaged with the substrate connector.

In the operation of the connecting structure, when the mating connector is engaged with the substrate connector attached to the wiring substrate from the outside of the instrument casing, the mating connector is inserted into the insertion part of the instrument casing and subsequently guided by the guide part of the instrument casing.

According to the second aspect of the invention, the terminal retainer of the substrate connector comprises a bottom part in substantially parallel with the wiring substrate and a hood part extending from the periphery of the bottom part toward the wiring substrate thereby to cover the periphery of one end of the terminal and guide the insertion of the mating connector being engaged with the substrate connector.

With the above-mentioned constitution, the mating connector is engaged with the substrate connector under the guidance of the guide part of the instrument casing and also the hood part of the substrate connector.

According to the third aspect of the invention, the guide part of the instrument casing has a leading end in contact with one surface of the wiring substrate, while the hood part of the substrate connector has a leading end in contact with the other surface of the wiring substrate.

With the above constitution, the wiring substrate butts against the leading end of the guide part of the instrument casing in process of fitting the wiring substrate to the instrument casing. Consequently, the guide part of the instrument casing, the insertion part of the wiring substrate and the hood part of the substrate connector do constitute a successive guide for inserting the mating connector into the substrate connector.

According to the fourth aspect of the invention, the insertion part of the wiring substrate comprises a through-hole arranged in alignment with the guide part of the instrument casing and the hood part of the substrate connector, for allowing the mating connector to pass.

In this case, the above successive guide is constituted by the guide part, the through-hole of the wiring substrate and the hood part.

According to the fifth aspect of the invention, the terminal retainer of the substrate connector comprises a terminal retainer plate in substantially parallel with the wiring substrate and wherein the guide part of the instrument casing is inserted into the insertion part of the wiring substrate and further extended so that the leading end of the guide part reaches the periphery of the terminal retainer plate.

In this case, the guide part of the instrument casing can act in the hood part's place in the terminal retaining part of the substrate connector.

According to the sixth aspect of the invention, the instrumental casing is an automotive meter casing having a bottom part on which the wiring substrate is mounted.

With the attainment of miniaturization of the substrate connector, it is also possible to provide a compact automotive meter casing.

According to the seventh aspect of the invention, the connecting structure further comprises a fixing plate for fixing the wiring substrate in the automotive meter casing, wherein the fixing plate is accommodated in the automotive meter casing, so that the wiring substrate is pinched between the bottom part of the automotive meter casing and the fixing plate.

In this case, owing to the provision of the fixing plate, the wiring substrate can be stably accommodated in the automotive meter casing.

According to the eighth aspect of the invention, the terminal of the substrate connector has one end projecting from the wiring substrate and soldered to a conductor on the wiring substrate.

By soldering the end of the terminal to the wiring substrate, the integration between the substrate connector and the wiring substrate can be further enhanced.

According to the ninth aspect of the invention, the mating connector is provided, on both sides thereof, with a pair of ribs and wherein the substrate connector is provided, on both sides thereof, with a pair of grooves for engagement with the ribs in pairs.

Owing to the provision of the ribs and the grooves, it is possible to prevent the erroneous insertion of the mating connector into the substrate connector.

According to the tenth aspect of the invention, the instrument casing and the wiring substrate are respectively provided with grooves allowing the ribs to be inserted thereinto.

Also in this case, owing to the further provision of the grooves in the instrument casing and the wiring substrate, the smooth insertion of the mating connector can be attained while avoiding the erroneous insertion.

These and other objects and features of the present invention will become more fully apparent from the following description and appended claims taken in conjunction with the accompany drawings.

DESCRIPTION OF THE PREFERRED EMBODIMENT

Embodiments of the present invention will be described with reference to the drawings.

Figure 3:
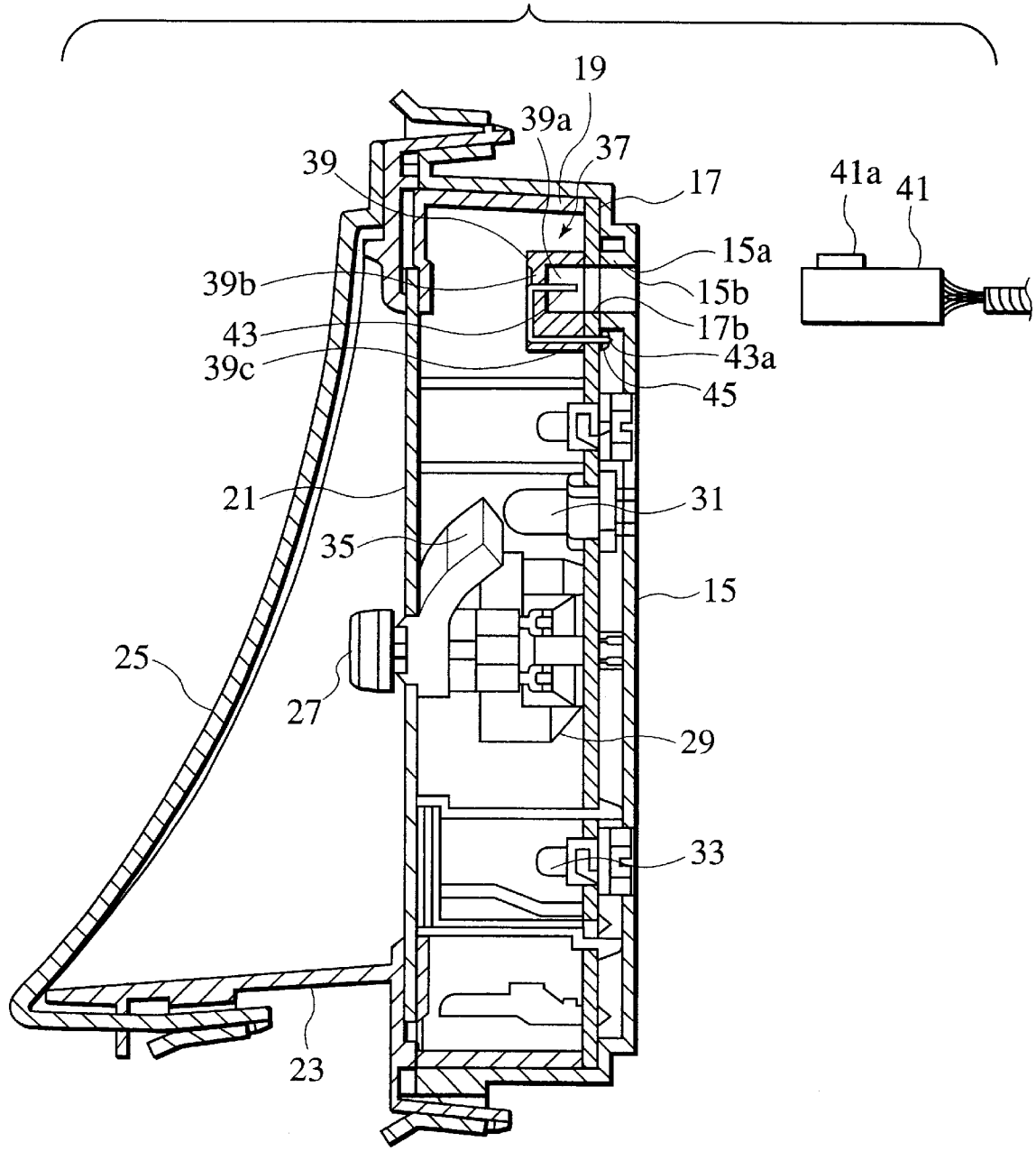
FIG. 3 is a sectional view of an automotive meter equipped with a connecting structure of a substrate connector in accordance with one embodiment of the invention.

FIG. 3 is a sectional view of an automotive meter equipped with a connecting structure of a substrate connector in accordance with one embodiment of the invention. A meter casing 15 as an instrument casing is opened on its front side corresponding to the left hand in the figure. Since a wiring substrate 17 and a fixing plate 19 are inserted into the meter casing 15 through the opened side, the wiring substrate 17 is securely pinched between the fixing plate 19 and the bottom of the meter casing 15.

A dial plate 21 is disposed on a surface of the fixing plate 19 on the opposite side of the wiring substrate 17. The dial plate 21 is pinched and secured between the fixing plate 19 and a facing member 23 fitted so as to cover the front opening of the meter casing 15. Further, a front glass 25 is fitted on the front side of the facing member 23.

On the wiring substrate 17, there are respectively attached a movement 29 for driving to rotate a needle 27 on the dial plate 21, an illumination valve 31 for lighting up the needle 27 and a valve 33 for illuminating a designed part for warning display etc. The light from the illumination valve 31 is transmitted to the needle 27 through the intermediary of an optical transmission plate 35 fitted on the back face of the dial plate 21.

Figure 1:
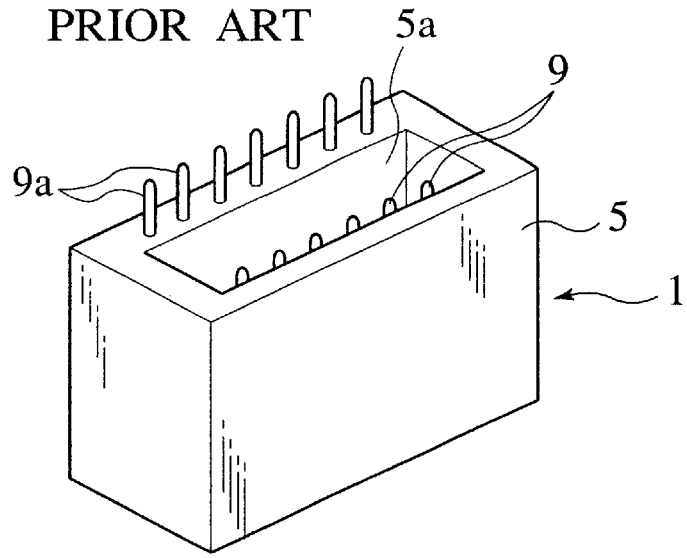
FIG. 1 is a perspective view showing one example of a conventional substrate connector.
Figure 4:
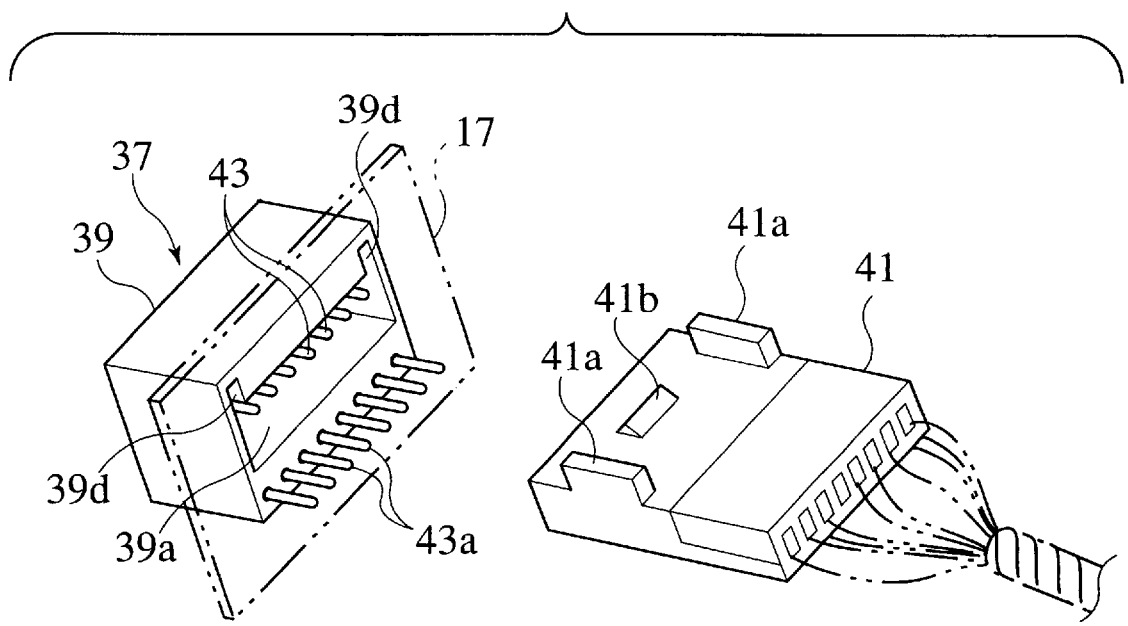
FIG. 4 is a perspective view of the substrate connector and another connector to be mated with the substrate connector.

On the wiring substrate 17, a substrate connector 37 is fitted on the wiring substrate's side to the fixing plate 19 and also on the upside of FIG. 1. As shown in FIG. 4 in perspective, the substrate connector 37 includes a housing 39 as a terminal retainer. The housing 39 is provided with a fit hole 39a to which a mating connector 41 is to be fitted. A plurality of male terminals 43 are accommodated in the fit hole 39a. Each male terminal 43 is partially bent and embedded in a bottom part 39b and a lateral part 39c constituting a hood part of the housing 39. The male terminal 43 is drawn so as to project to the opened side of the fit hole 39a, providing a leader end 43a of the terminal 43.

Figure 5:
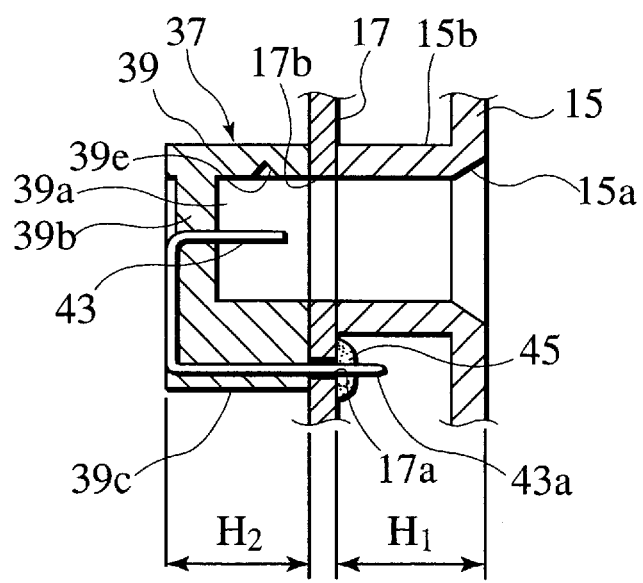
FIG. 5 is an enlarged sectional view of an essential part of FIG. 3.

As shown in FIG. 5 enlarging the essential part of FIG. 3, the leader end 43a is inserted into a terminal insertion hole 17a of the wiring substrate 17 and soldered to an inductor on the back side (i.e. the right side of FIGS. 3 and 5) of the substrate 17 by means of a solder 45. In this way, the substrate connector 37 is fitted on the wiring substrate 17. In this fitting condition, the leading end of the hood part 39c of the housing 39 butts against the back face of the wiring substrate 17, while the fit hole 39a is adjusted so as to be in alignment with a through-hole 17b (as the insertion part) formed in the substrate 17 and also another through-hole 15a (as the insertion part) formed in the meter casing 15. With the arrangement, the mating connector 41 is fitted to the substrate connector 37 through the respective through-holes 15a, 17b.

The meter casing 15 is provided, around the whole circumference of the through-hole 15a, with a guide part 15b which extends toward the wiring substrate 17. The leading end of the guide part 15b butts against the back face of the wiring substrate 17.

Figure 2:
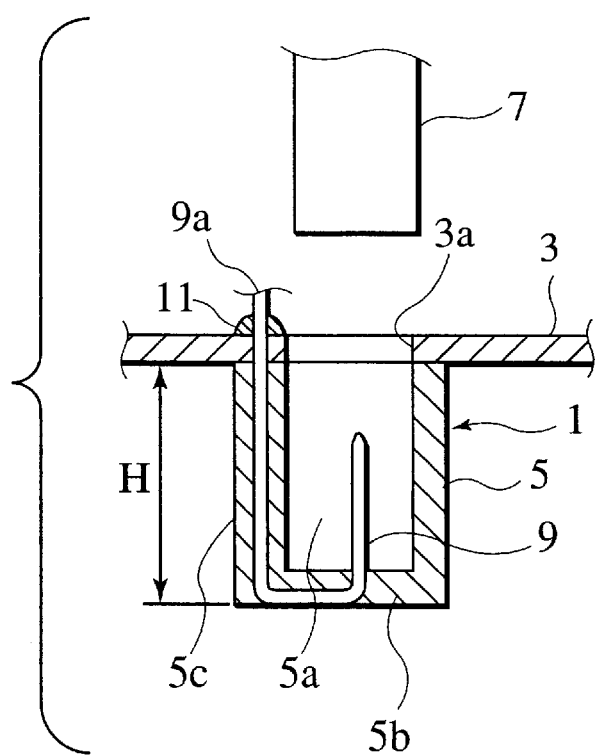
FIG. 2 is a sectional view showing the substrate connector of FIG. 1, which is fitted to a wiring substrate.

The sum of height H1 of the guide part 15b and height H2 of the hood part 39c of the housing 39 of the substrate connector 37 is generally equal to the height H of the hood part 5c of the housing 5 of the conventional substrate connector 1 of FIGS. 1 and 2. With the establishment of heights, it is possible to prevent the mating connector 41 from being forcibly fitted to the substrate connector 37 while the connector 41 is being inclined to the connector 37, in other words, the occurrence of improper mating.

As shown in FIG. 4, a pair of ribs 41a, 41a are formed on both sides of the connector 41 in the direction of width (also formed on the connector's upper face in the figure). On the upper face of the connector 41, an engagement projection 41b is also formed between the opposing ribs 41a, 41a. In connection, the above ribs 41a are inserted into grooves 39d formed in the substrate connector 37 thereby to prevent the occurrence of incomplete engagement between the connectors 37, 41. Then, the engagement projection 41b is engaged in an engagement recess 39e formed on a sidewall defining the fit hole 39a, thereby preventing the connector 41 from slipping off the connector 37. Corresponding to the ribs 41a, the meter casing 15 and the wiring substrate 17 are respectively provided with not-shown grooves into which the ribs 41a are to be inserted.

In the operation of the above-mentioned connecting structure, when the mating connector 41 is engaged with the substrate connector 37, the insertion of the mating connector 41 is first guided by the guide part 15b of the meter casing 15 and subsequently, the connector 41 is fitted into the fit hole 39a through the through-hole 17b of the wiring substrate 17 under the guidance of the hood part 39c of the housing 39.

Thus, owing to the provision of the meter casing 15 with the guide part 15b serving as a guide for the mating connector 41, it is possible to reduce the height H2 of the hood part 39c also guiding the insertion of the mating connector 41 in comparison with the height H of the conventional hood part 5c shown in FIGS. 1 and 2 and correspondingly, it is also possible to shorten the full lengths of the male terminals 43 thereby to accomplish the miniaturization of the substrate connector 37 and the reduction in manufacturing cost. With the attainment of miniaturization, the connecting structure of the invention can be installed in a narrower area with the improved applicability.

Figure 6:
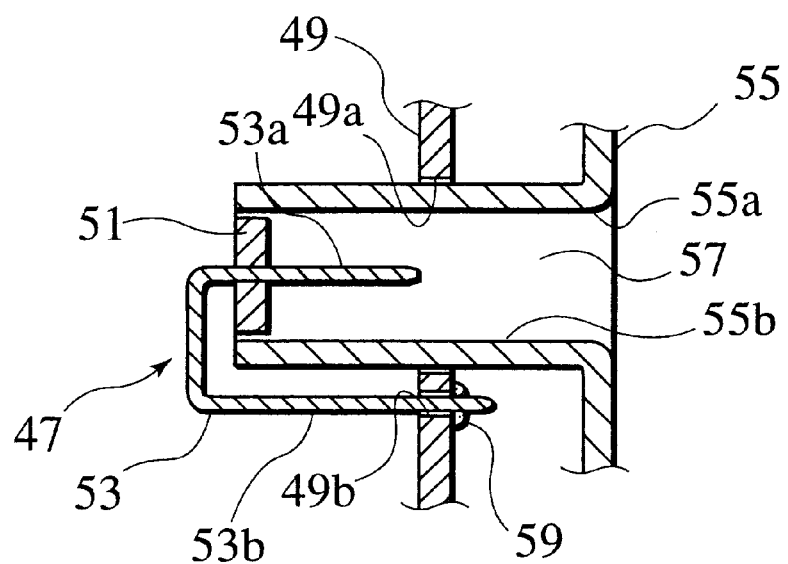
FIG. 6 is a sectional view similar to FIG. 5, showing another embodiment of the invention.
Figure 7:
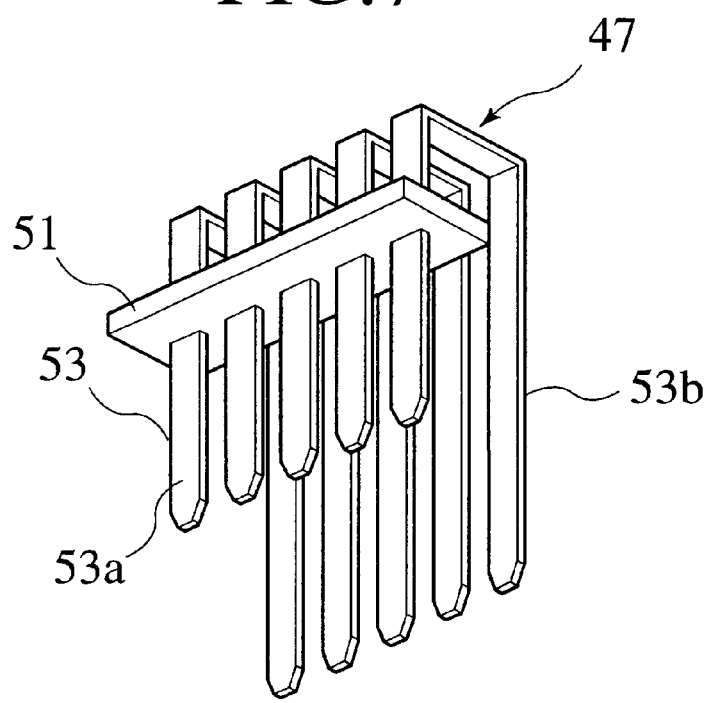
FIG. 7 is a perspective view of the substrate connector used in the connecting structure of the substrate connector of FIG. 6.

FIG. 6 is a sectional view similar to FIG. 5, showing another embodiment of the invention. According to this embodiment, as shown in FIG. 7, a substrate connector 47 is provided, as the previous terminal retainer, with a terminal retainer plate 51. The terminal retainer plate 51 is arranged in substantial parallel with a wiring substrate 49 under condition that the plate 51 is fitted to the wiring substrate 49. A plurality of male terminals 53 are press-fitted into the terminal retainer plate 51.

As the insertion part of the instrument casing, a meter casing 55 has a through-hole 55a for receiving the mating connector (not shown). The meter casing 55 has a guide part 55b formed around the full periphery of the through-hole 55a so as to extend from the through-hole 55a up to the periphery of the terminal retainer plate 51. That is, the guide part 55b operates as a hood part for the substrate connector 47. Substrate 49 has an insertion hole 49a through which the meter casing 55 passes.

Figure 8:
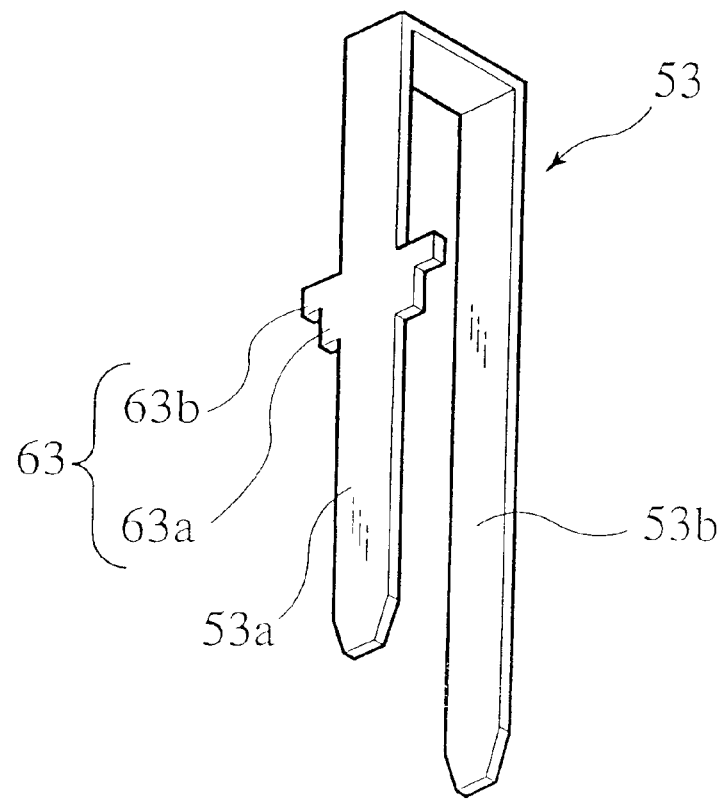
FIG. 8 is a perspective view of a male terminal of the substrate connector of FIG. 7.
Figure 9:
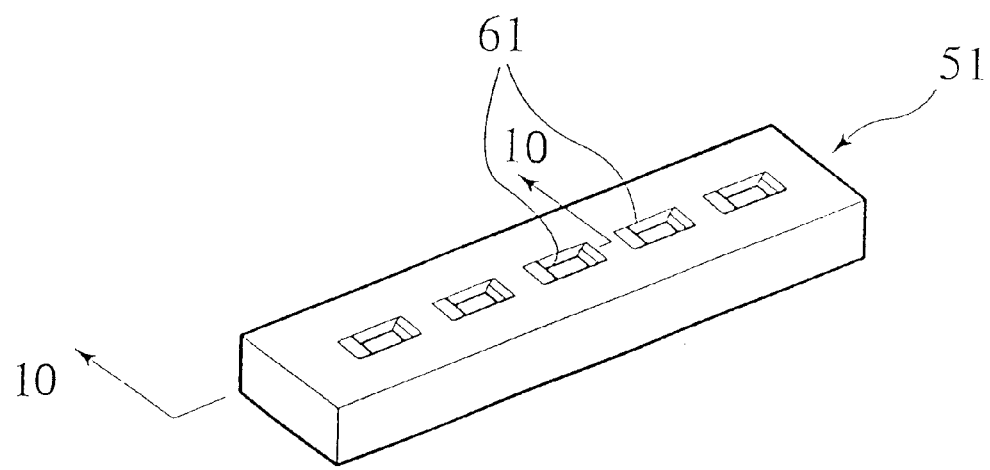
FIG. 9 is a perspective view of a retainer plate of the substrate connector of FIG. 7.

FIG. 8 is a perspective view of the single male terminal 53 and FIG. 9 is a perspective view of the terminal retainer plate 51. The male terminal 53 includes a fitting part 53a and a fixing part 53b. The fitting part 53a is positioned in a fitting chamber 57 (FIG. 6) surrounded by the guide part 55b, for engagement with a not-shown female terminal of the mating connector. The fixing part 53b is bent so as to be parallel with the fitting part 53a outside the guide. Fixing part 53b is also provided with a leading end inserted into a terminal insertion hole 49b of the wiring substrate 49. Note, the leading end of the fixing part 53b is fixed to an conductor (not shown) on the wiring substrate 49 by means of a solder 59.

Figure 10:
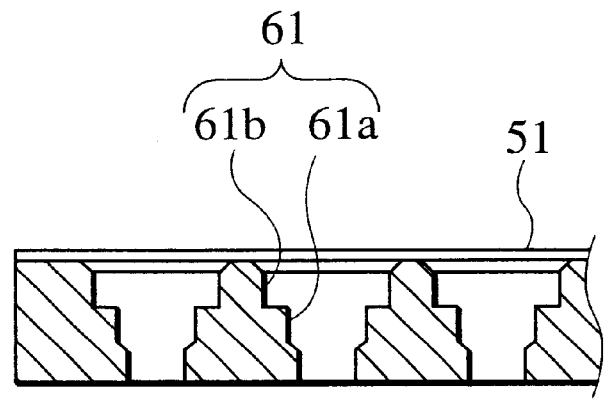
FIG. 10 is an enlarged sectional view of the retainer plate, taken along a line of 10—10 of FIG. 9.
Figure 11:
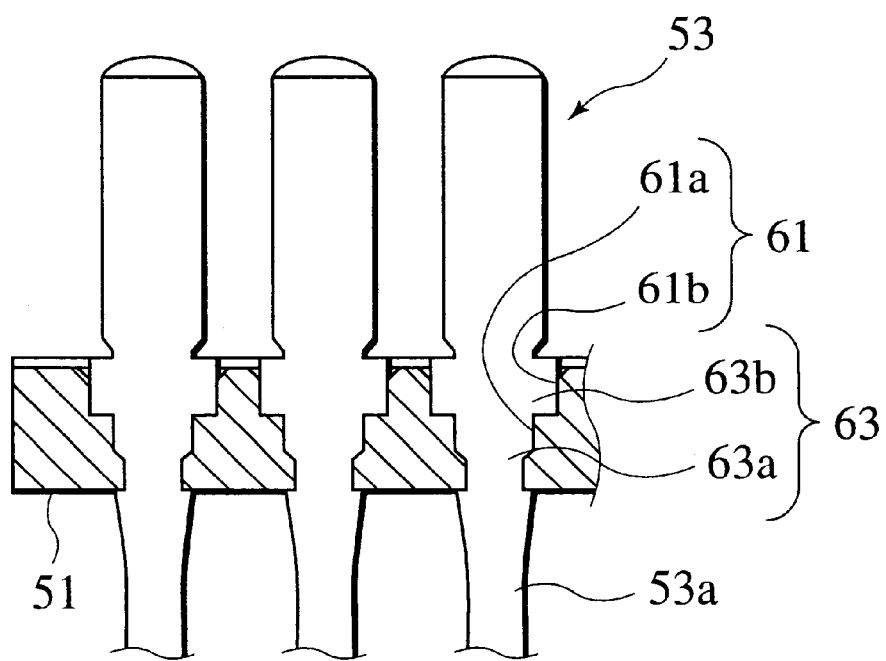
FIG. 11 is a partial sectional view of the retainer plate of FIG. 10, also showing the male terminals being fitted to respective "press fitting" holes in the retainer plate.

As shown in FIG. 8, the male terminal 53 of the substrate connector 47 has a press-fit part 63 formed between the bending part and the fitting part 53a. The press-fit part 63 is fitted into a press-fit hole 61 formed in the terminal retainer plate 51 under pressure. The press-fit part 63 includes a first stepped part 63a of larger width than the fitting part 53a and a second stepped part 63b of larger width than the first stepped part 63a. Corresponding to the formation of the press-fit part 63, the press-fit hole 61 of the terminal retainer plate 51 is provided with a first stepped fitting part 61a for engagement with the first stepped part 63a and a second stepped fitting part 61b for engagement with the second stepped part 63b, as shown in FIG. 10. FIG. 11 shows a condition where the respective press-fit parts 63 of the male terminals 53 are closely fitted into the press-fit holes 61 from the upside of the terminal retainer plate 51.

In the operation of to the above-mentioned connecting structure, when the mating connector is engaged with the substrate connector 47, the insertion of the mating connector can be guided by the guide part 55b of the meter casing 55. Then, since the substrate connector 47 is constituted by the terminal retainer plate 51 while abolishing the hood part as shown in FIG. 5, it is possible to progress the miniaturization and lightweight of the substrate connector 47.

It will be understood by those skilled in the art that the foregoing description are preferred embodiments of the disclosed connecting structure. Various changes and modifications may be made to the present invention without departing from the scope of the invention.

What is claimed is:

1. A connecting structure for a substrate connector and a mating connector to be mated with the substrate connector, the substrate connector having at least one terminal and a terminal retainer for carrying the terminal, the connecting structure comprising:

an instrument casing; and a wiring substrate fitted to the instrument casing, the wiring substrate having one surface opposing the instrument casing and the other surface having the substrate connector fitted thereon;

wherein the instrument casing and the wiring substrate are together provided with respective insertion parts which allow the mating connector to be inserted thereinto when the mating connector is engaged with the substrate connector; and the insertion part of the instrument casing has a guide part formed to extend toward the wiring substrate, for guiding the insertion of the mating connector being engaged with the substrate connector.

2. A connecting structure as claimed in claim 1, wherein the terminal retainer of the substrate connector comprises:

a bottom part substantially parallel with the wiring substrate; and a hood part extending from the periphery of the bottom part toward the wiring substrate thereby to cover a periphery of one end of the terminal and guide the insertion of the mating connector being engaged with the substrate connector.

3. A connecting structure as claimed in claim 2, wherein the guide part of the instrumental casing has a leading end in contact with one surface of the wiring substrate, while the hood part of the substrate connector has a leading end in contact with the other surface of the wiring substrate.

4. A connecting structure as claimed in claim 3, wherein the insertion part of the wiring substrate comprises a through-hole arranged in alignment with the guide part of the instrument casing and the hood part of the substrate connector, for allowing the mating connector to pass.

5. A connecting structure as claimed in claim 1, wherein the instrumental casing is an automotive meter casing having a bottom part on which the wiring substrate is mounted.

6. A connecting structure as claimed in claim 5, further comprising a fixing plate for fixing the wiring substrate in the automotive meter casing, wherein the fixing plate is accommodated in the automotive meter casing, so that the wiring substrate is pinched between the bottom part of the automotive meter casing and the fixing plate.

7. A connecting structure as claimed in claim 1, wherein the mating connector is provided with a pair of ribs, one rib on each side of the mating connector, and wherein the substrate connector is provided with a pair of grooves, one groove on each side of the substrate connector, for engagement with the ribs in pairs.

8. A connecting structure as claimed in claim 7, wherein the instrumental casing and the wiring substrate are respectively provided with grooves allowing the ribs to be inserted thereinto.

9. A connecting structure as claimed in claim 1, wherein the terminal retainer of the substrate connector comprises a terminal retainer plate substantially parallel with the wiring substrate and wherein the guide part of the instrumental casing is inserted into the insertion part of the wiring substrate and further extended so that a leading end of the guide part reaches the periphery of the terminal retainer plate.

10. A connecting structure as claimed in claim 1, wherein the terminal of the substrate connector has one end projecting from the wiring substrate and soldered to a conductor on the wiring substrate.

* * * * *